United States Patent
Mello

(10) Patent No.: US 10,808,155 B2
(45) Date of Patent: Oct. 20, 2020

(54) ICE MELT APPARATUS

(71) Applicant: Kenneth J. Mello, Foxboro, MA (US)

(72) Inventor: Kenneth J. Mello, Foxboro, MA (US)

( * ) Notice: Subject to any disclaimer, the term of this patent is extended or adjusted under 35 U.S.C. 154(b) by 771 days.

(21) Appl. No.: 15/401,581

(22) Filed: Jan. 9, 2017

(65) Prior Publication Data

US 2017/0198183 A1     Jul. 13, 2017

Related U.S. Application Data

(60) Provisional application No. 62/276,594, filed on Jan. 8, 2016.

(51) Int. Cl.
*C09K 3/18*       (2006.01)
*B65D 65/46*     (2006.01)
*B65D 75/42*     (2006.01)

(52) U.S. Cl.
CPC .............. *C09K 3/185* (2013.01); *B65D 65/46* (2013.01); *B65D 75/42* (2013.01)

(58) Field of Classification Search
CPC ......... C09K 3/185; B65D 65/46; B65D 75/42
USPC ........................................................ 252/70
See application file for complete search history.

(56) References Cited

U.S. PATENT DOCUMENTS

| | | | | |
|---|---|---|---|---|
| 2,621,648 A * | 12/1952 | Carfano | ............... | E05B 17/0016 126/263.01 |
| 2,703,902 A * | 3/1955 | Thomas | ................ | B60S 1/3805 15/250.09 |
| 3,023,748 A * | 3/1962 | Bruskin | ............... | E05B 17/0016 126/229 |
| 4,094,805 A * | 6/1978 | Hansen | ..................... | C09K 3/18 106/13 |
| 4,148,938 A * | 4/1979 | Hansen | ..................... | C09K 3/18 106/13 |
| 4,805,323 A * | 2/1989 | Motohashi | ............ | B60S 1/0402 15/105 |
| 5,022,470 A * | 6/1991 | Andersen | ................. | E21B 7/008 175/14 |
| 5,065,471 A * | 11/1991 | Laplante | ............... | B60S 1/3415 15/250.04 |
| 5,135,674 A * | 8/1992 | Kuhajek | ................. | C09K 3/185 252/70 |
| 7,105,105 B2 * | 9/2006 | Samuels | ................. | C09K 3/185 252/70 |
| 7,169,321 B2 * | 1/2007 | Simmons | ............... | C09K 3/185 252/70 |
| 2003/0116748 A1* | 6/2003 | Haslim | ..................... | C09D 5/04 252/70 |
| 2009/0218541 A1* | 9/2009 | Wehner | ..................... | A61Q 5/02 252/70 |
| 2017/0022404 A1* | 1/2017 | Clark | ..................... | A01M 99/00 |

* cited by examiner

*Primary Examiner* — Douglas J McGinty
(74) *Attorney, Agent, or Firm* — Onello & Mello, LLP

(57) ABSTRACT

Provided is an ice melt device comprising ice melt product and a casing having one or more compartments containing the melt product. The casing is configured to provide access to the ice melt product by external ice and/or moisture. The casing can be elongate and take the form of an ice melt strip. The ice melt device can be applied in an ice formation area before ice formation as an ice formation prevention strategy and/or the ice melt device be applied directly on ice in the ice formation area as an ice removal strategy.

20 Claims, 1 Drawing Sheet

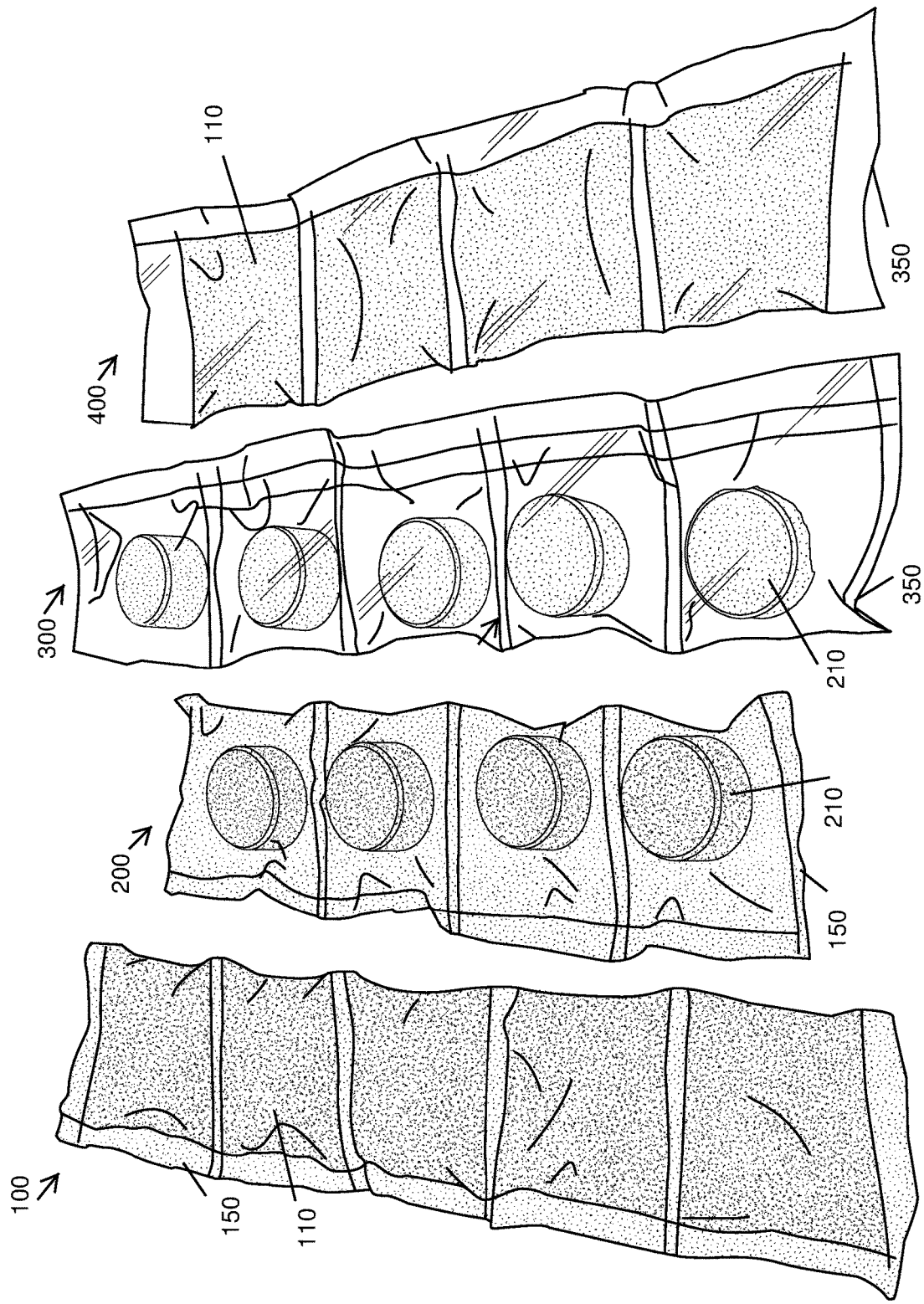

ICE MELT APPARATUS

CROSS REFERENCE TO RELATED APPLICATIONS

This application claims the benefit of U.S. Provisional Patent Application No. 62/276,594 filed on Jan. 8, 2016, the contents of which are incorporated herein by reference in its entirety.

FIELD OF INTEREST

The present inventive concepts relate to the field of home maintenance, and more particularly to the field of systems, devices and methods for melting ice in gutters, rooflines, and the like.

BACKGROUND

Ice dams are a significant problem in many cold-weather communities, such as many New England towns. Ice dams form in gutters and the edges of roofs, whether homes or commercial properties. When an ice dam forms, water from rain, melted snow, or melted ice can back up under roof shingles, for example, and leak into buildings. The water leaking into the building can cause serious damage to walls, floors, and other parts of the structure.

SUMMARY

In accordance with one aspect of the present disclosure, provided is an ice melt device, comprising ice melt product and a casing having one or more compartments containing the melt product and configured to provide access to the ice melt product by external ice and/or moisture.

In various embodiments, the ice melt product comprises ice melt pellets.

In various embodiments, the ice melt product comprises ice melt tablets.

In various embodiments, the casing is a water soluble casing.

In various embodiments, the water soluble casing includes a water soluble film.

In various embodiments, the water soluble casing includes a water soluble fabric.

In various embodiments, the one or more compartments is a single compartment.

In various embodiments, the one or more compartments is a plurality of compartments.

In various embodiments, the plurality of compartments is formed by a water soluble material.

In various embodiments, the soluble material takes of the form of one or more of a water soluble thread, glue, or the like.

In various embodiments, the casing is elongate and the ice melt device is an ice melt strip.

In various embodiments, the ice melt strip is between 1 and 6 inches wide.

In various embodiments, the ice melt strip is about three feet long or less.

In various embodiments, the elongate casing is an ice melt roll of at least ten feet in length that can be divided or cut to form an ice melt strip of a user-chosen length.

In accordance with another aspect of the inventive concept, provided is an ice melt device as shown.

In accordance with another aspect of the inventive concept, provided is a method of melting ice, including applying an ice melt device from any of claims 1 through 15 to an ice formation area.

In various embodiments, the ice formation area is a gutter.

In various embodiments, the ice formation area is a stair, walkway, or landing.

In various embodiments, the method includes applying the ice melt device in the ice formation area before ice formation as an ice formation prevention strategy.

In various embodiments, the method includes applying the ice melt device directly on ice in the ice formation area as an ice removal strategy.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIG. 1 is a view of a first embodiment of an ice melt apparatus, in accordance with aspects of the inventive concept;

FIG. 2 is a view of a second embodiment of an ice melt apparatus, in accordance with aspects of the inventive concept;

FIG. 3 is a view of a third embodiment of an ice melt apparatus, in accordance with aspects of the inventive concept; and FIG. 4 is a view of a fourth embodiment of an ice melt apparatus, in accordance with aspects of the inventive concept.

DETAILED DESCRIPTION OF PREFERRED EMBODIMENTS

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments may be described herein with reference to schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein, but may include deviations in shapes that result, for example, from manufacturing.

In accordance with aspects of the present invention, provided is an ice melt device, embodiments of which are shown in FIGS. 1 through 4. The ice melt device can be used on roofs and rooflines, steps, walkways, driveways, and so on.

The ice melt device has a casing having a set of one or more compartments, each compartment configured to receive and contain an ice melt product. The ice melt product (or ice melt) can take one of a variety of forms. As examples, the ice melt can take the form of pellets or tablets. Each form is presently available for purchase. Various types of ice melt compositions may be used, such as those including sodium chloride (rock salt), potassium chloride, magnesium chloride, calcium chloride, and ice melt products incorporating glycols and similar compounds.

The ice melt product can take one or more of various forms, e.g., ice melt pellets and/or ice melt tablets. For example, MONSON/KODA (www.monsonco.com) of Leominster, Mass. makes calcium chloride ice pellets named Super-Melt. And Kassoui Manufacturing Inc. of Belding, Mich. makes calcium chloride roof melt tablets. Other companies making similar products exist, such as pellets made by Oxy Chemical.

In various embodiments, the entire ice melt device is made of water-dissolvable materials, so is completely or substantially 100% dissolvable outdoors. Preferably, all materials are environmentally safe, or "friendly," so are not harmful or toxic to the environment or living beings. Thus, in various embodiments, as the ice melt device dissolves the ice, the water dissolves the ice melt device, eventually eliminating or reducing ice with no subsequent cleanup of the ice melt apparatus required. That is, the ice melt device can be completely dissolvable, leaving no residue once dissolved.

FIGS. 1-4 show four working ice melt device embodiments, in accordance with aspects of the inventive concept. FIG. 1 shows an ice melt device 100, FIG. 2 shows an ice melt device 200, FIG. 3 shows an ice melt device 300, and FIG. 4 shows an ice melt device 400. In each embodiment, the ice melt device is in the form of an ice melt strip.

In the illustrated embodiments, an ice melt strip is elongate, having a length that is greater than its width. In FIGS. 1-4, the ice melt strip is between about 3-6 inches wide and between about 1 to 3 feet in length. Such form can make it relatively easy for a user, such as a home or business owner, to reliably toss or otherwise place the ice melt apparatus in or on gutters or roof lines. However, the present invention is not limited to these particular dimensions. For example, ice meld strips can be much longer. In some embodiments, the ice melt device can take the form of an ice melt roll that a user can cut to a desired length, e.g., by cutting between two compartments. That is, wherein the elongate casing is an ice melt roll of at least ten feet in length that can be divided or cut to form an ice melt strip of a user-chosen length.

For example, a user could place ice melt strips in a gutter before a heavy snow storm to promote melting and drainage of the snow, thereby reducing the chance for ice dam formation. Otherwise, a user could place an ice melt strip across an existing ice dam to create a channel for water drainage. In either case, when the snow or ice contacts the ice melt device, the snow or ice melts and the water from the melt causes further dissolving of the ice melt product, which in turn promotes further melting of ice or snow.

In each of these embodiments of FIGS. 1-4, an ice melt product is maintained within a casing, to collectively from an ice melt strip. As examples, the ice melt product can be or include ice melt pellets 110 (FIGS. 1 and 4) or ice melt tablets or disks 210 (FIGS. 2 and 3). And, in various embodiments, the casings can be made of a material that dissolves in water. Each casing defines one or more compartments configured to maintain ice melt product. In FIGS. 2 and 3, the compartments are sized to hold one or more ice melt tablet and/or ice melt pellets.

In some embodiments, the compartments can be formed in the casing by thread, glue, or some other manner of combining opposing layers of the casing material. In such cases, the thread, glue or other material can be dissolvable.

In the four embodiments shown in FIGS. 1-4, the ice melt devices, including the casings, are 100% dissolvable, even when they include the thread. In two versions, i.e., FIGS. 1-2, there is provided a clear package 150 that starts to melt as soon as they get wet. In the other two versions, i.e., FIGS. 3-4, there is provided a white dissolvable fabric 350 that starts to melt within five (5) minutes of getting moist or wet.

The clear ones start to work and dissolve instantly and the white ones start to dissolve in just a few minutes, which gives a user handling time, if the user's hands are wet.

The clear film can be the type made by Inspira, which is a form of water soluble film. The white fabric can be the type made by Inspira, which is called water soluble fabric. The thread can be the type made by Superior Threads, which is called Vanish, which is a form of water soluble thread.

In some embodiments, the casing can be permeable or semipermeable. In such embodiments, the case can be dissolvable, as described above, or not dissolvable. That is, as example, the casing can be made of a mesh, twine or fabric, or fabric with openings defined therein. In these types of embodiments, the ice melt could contact the ice through the openings to begin the ice melt process. When the case is not dissolvable, the case can be reusable. When reusable, the case can include one or more pockets for holding ide melt product. The pockets could be closed by any common device, such as zipper, Velcro, or ties, as examples.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. An ice melt device, comprising:
   ice melt product; and
   a casing having one or more compartments containing the melt product and configured to provide access to the ice melt product by external ice and/or moisture,
   wherein the casing is elongate and the ice melt device is an ice melt strip.

2. The device of claim 1, wherein the ice melt product comprises ice melt pellets.

3. The device of claim 1, wherein the ice melt product comprises ice melt tablets.

4. The device of claim 1, wherein the casing is a water soluble casing.

5. The device of claim 4, wherein the water soluble casing includes a water soluble film.

6. An ice melt device, comprising:
   ice melt product; and
   a casing having one or more compartments containing the melt product and configured to provide access to the ice melt product by external ice and/or moisture,
   wherein the casing includes a water soluble fabric.

7. The device of claim 1,
   wherein the one or more compartments is a single compartment.

8. The device of claim 1, wherein the one or more compartments is a plurality of compartments.

9. The device of claim 1, wherein the one or more compartments is formed of a water soluble material.

10. The device of claim 9, wherein the water soluble material takes the form of one or more of a water soluble thread or glue.

11. The device of claim 6, wherein the casing is elongate and the ice melt device is an ice melt strip.

12. The device of claim 1, wherein the ice melt device takes the form of an ice melt strip that is between 1 and 6 inches wide.

13. The device of claim 1, wherein the ice melt device takes the form of an ice melt strip that is about three feet long or less.

14. The device of claim 1 wherein the casing is an ice melt roll of at least ten feet in length that can be divided or cut to form an ice melt strip of a user-chosen length.

15. An ice melt device, comprising:
    ice melt product; and
    a casing having a plurality of compartments containing portions of the ice melt product and configured to provide access to the ice melt product by external ice and/or moisture,
    wherein the casing is elongate and the ice melt device is an elongate ice melt strip.

16. The device of claim 15, wherein the casing is a water soluble casing.

17. An ice melt device, comprising:
    ice melt product; and
    a water soluable casing having one or more compartments containing portions of the ice melt product and configured to provide access to the ice melt product by external ice and/or moisture,
    wherein the ice melt device takes the form of an ice melt strip.

18. The device of claim 17, wherein the ice melt product comprises at least one of ice melt pellets or tablets.

19. The device of claim 17, wherein the ice melt strip is between 1 and 6 inches wide.

20. The device of claim 17, wherein the casing is an ice melt roll of at least ten feet in length that can be divided or cut to form an ice melt strip of a user-chosen length.

* * * * *